TUNER FOR TELEVISION RECEIVERS

Filed April 7, 1950 5 Sheets-Sheet 1

INVENTOR.
EMMERY J. H. BUSSARD
BY
Alden D. Redfield
Charles M. Hogan
ATTORNEYS

| $f$ | $R$ | $X_L$ | $X_C$ | $Z_{IN}$ | |
|---|---|---|---|---|---|
| 57.5 | 160 | 159 | 565 | 129.5 | 54.2° |
| 69.5 | | 192 | 467 | 143.8 | 63.9° |
| 85.5 | | 242 | 372 | 155.8 | 76.94° |
| 130 | | 359 | 250 | 155.5 | -76.58° |
| 177.5 | | 490 | 183 | 140 | -61.32° |
| 195.5 | | 540 | 166 | 133 | -56.32° |
| 213.5 | | 590 | 152 | 126 | -52° |
| 108 | | 300 | 300 | 160 | 0° |

INVENTOR.
EMMERY J. H. BUSSARD
BY Alden D. Redfield
Charles M. Logan
ATTORNEYS.

Dec. 25, 1951 E. J. H. BUSSARD 2,579,789

TUNER FOR TELEVISION RECEIVERS

Filed April 7, 1950 5 Sheets-Sheet 3

INVENTOR.
EMMERY J. H. BUSSARD
BY Alden D. Redfield
Charles M. Hogan
ATTORNEYS

Dec. 25, 1951 E. J. H. BUSSARD 2,579,789

TUNER FOR TELEVISION RECEIVERS

Filed April 7, 1950 5 Sheets-Sheet 4

INVENTOR.

EMMERY J. H. BUSSARD

BY Alden D. Redfield

Charles M. Hogan

ATTORNEYS.

Dec. 25, 1951 E. J. H. BUSSARD 2,579,789

TUNER FOR TELEVISION RECEIVERS

Filed April 7, 1950 5 Sheets-Sheet 5

INVENTOR.
EMMERY J. H. BUSSARD
BY
Alden D. Redfield
Charles M. Hogan
ATTORNEYS.

Patented Dec. 25, 1951 2,579,789

UNITED STATES PATENT OFFICE 2,579,789

TUNER FOR TELEVISION RECEIVERS

Emmery J. H. Bussard, Cincinnati, Ohio, assignor to Avco Manufacturing Corporation, Cincinnati, Ohio, a corporation of Delaware Application April 7, 1950, Serial No. 154,535

4 Claims. (Cl. 179—171)

The present invention embraces an improved tuner which is of particular utility as embodied in a television receiver. The tuner is, in popular parlance, denominated "the front end" of a television receiver and the primary objectives of this invention are to provide a front end circuit having gain and noise characteristics in particular which represent a considerable advance in the art and performance characteristics in general which compare favorably with commercial tuners presently on the market. The tuner is provided in accordance with the invention is of the continuous type—that is, it is continuously tunable by one manual operation through the lower standard television broadcast band extending from 54–88 megacycles, the frequency modulation broadcast band extending from 88–108 megacycles, and the upper television broadcast band which covers the range from 174–216 megacycles.

The primary object of the present invention is to provide a tuner including a radio frequency stage input circuit which satisfies the following requirements:

(1) Prevention of undue decrease in gain on the higher channels by reason of cathode to ground capacitance;

(2) The provision of a workable match between the R. F. stage tube input and the antenna transmission line impedance through all television channels;

(3) The provision of an effective short-circuit to ground for lower radio-frequency signals, such, for example, as those produced by nearby amplitude modulation broadcast stations in the 550–1600 kilocycle band, and even for signals up to the intermediate frequency range;

(4) The provision of a direct-current leakage path which prevents the accumulation of static charges on the antenna;

(5) The maintenance of a high signal-to-noise ratio.

Another object of the invention is to provide a tuner having between its radio frequency amplifier and frequency changing stages a tunable band pass selector network which manifests the following desirable characteristics:

(1) The maintenance of a wide acceptance band adequate to translate the composite television signal inclusive of video and synchronizing signal and sound components during operation on each of the channels;

(2) The preservation of adequately uniform gain characteristics throughout the two television bands inclusive of all of said channels.

Another object of the invention is to provide in a television tuner, a novel oscillator circuit which is tunable through the range extending from approximately 80 to 240 megacycles, and which at the same time satisfies the following requirements:

(1) Substantial uniformity of the intensity of the local oscillation signal output throughout that range;

(2) Stable operation throughout that range.

Another basic object of the invention is to provide a tuner which possesses the above-mentioned desirable noise and gain characteristics and at the same time is operable from a relatively low voltage space current supply.

For a better understanding of the present invention, together with other and further objects, capabilities and advantages thereof, reefrence is made to the following description of the accompanying drawings, in which there is shown a preferred illustrative tuner in accordance with the invention. Reference is made to my copending patent application Serial No. 175,057, entitled "Constant Band Width Coupling Circuit for Television Receiver Tuner," filed in the United States Patent Office July 21, 1950, and assigned to the same assignee as the present application and invention, for the scope of the claim coverage relating to matter disclosed but not claimed herein, such matter relating to the tunable band pass selector network illustrated in Figs. 1, 6, 7, and 8 herein, and circuit combinations inclusive of the continuous tuner illustrated in Fig. 11. Reference is also made to my copending patent application Serial No. 208,165, entitled "Oscillator," filed in the United States Patent Office January 27, 1951, and assigned to the same assignee as the present application and invention, for the scope of the claim coverage relating to matter disclosed but not claimed herein, such matter relating to the oscillator circuit illustrated in Figs. 1, 9, and 10.

Figure 1:
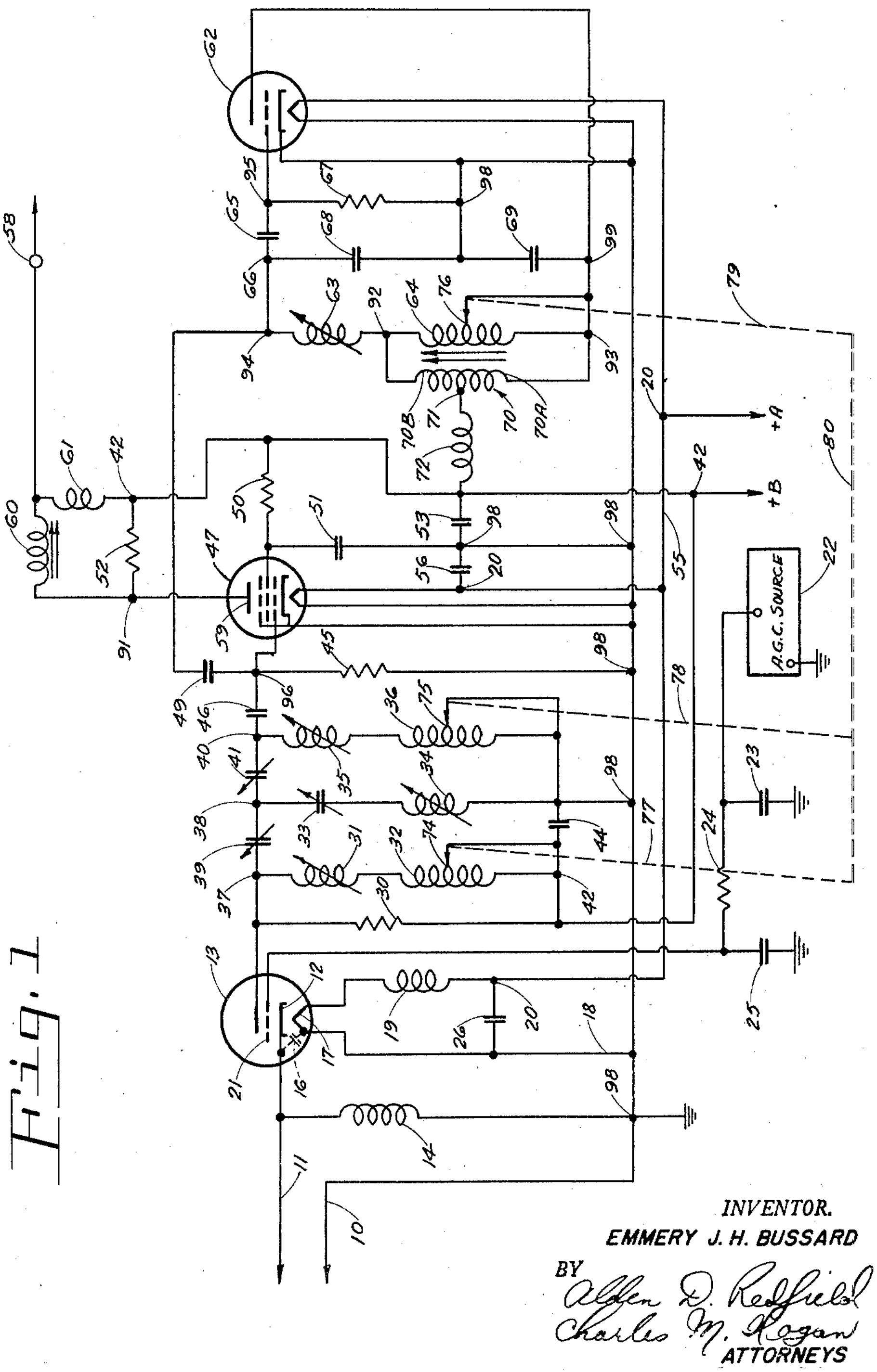
Fig. 1 is a circuit schematic of my improved tuner.

The tuner comprises the following principal stages: a radio-frequency amplifier or preselector stage and an oscillator-modulator or frequency-changer stage including a mixer tube and an oscillator tube coupled to the mixer tube to inject local oscillations therein, together with associated circuitry and mechanisms for intercoupling and uni-controlling the two stages.

The preselector or R. F. stage has a novel broadly fixed-tuned antenna input circuit provided in accordance with the invention and possessing the desirable characteristics mentioned below. In the specific example shown, this circuit (Fig. 1) is coupled to an unbalanced line such as a 75 ohm coaxial cable, the outer conductor 10 of which is grounded and the inner conductor 11 of which is connected to the cathode 12 of the R. F. amplifier tube 13. The arrangement herein employed is referred to as a low impedance unbalanced cathode input. In accordance with the invention there is provided an inductor 14 between cathode and ground 98 (all grounded points having that reference numeral), this inductor having such a value that it resonates with the inherent cathode-heater capacity of the tube (dashed lines 16) at approximately the geometric mean of the range of television signal frequencies to be received. This range extends from 54 to 216 megacycles, so that the geometric mean is approximately 108 megacycles. This combination of lumped inductance 14 and inherent capacitance 16 provides a broadly tuned circuit which performs four significant functions: (1) It prevents the cathode-to-ground capacitance from unduly decreasing the input impedance of the stage and consequently the gain as the high frequency end of the range is approached, in that it provides an effective input impedance which is broadly peaked and relatively constant for all channels; (2) while a broad bypass characteristic is provided, this circuit at the same time affords a workable match between the tube input and the antenna transmission line impedance; (3) the inductor 14 serves as a low pass filter or effective short circuit to ground for low frequency R. F. signals, such as those produced by nearby amplitude-modulation broadcast stations in the 550–1600 kilocycle band, and in fact for any undesired signals up to and including signals on the order of 25 megacycles that is, signals on the order of the intermediate frequencies employed in standard television receivers; (4) the inductor 14 also serves as a direct current leakage path and prevents the accumulation of static charges on the antenna.

A suitable triode 13, such as a type 6AB4, is preferably used for this stage, one side of the heater 17 being grounded through lead 18. The other heater terminal is connected in series with a choke 19 and the ungrounded terminal 20 of the filament current source. A triode is preferred to a pentode, because of its lower tube noise level and lower interelectrode capacitance. The control electrode 21 is connected to an appropriate source of automatic gain control potential, indicated by the reference numeral 22. This source may be identical to that shown in U. S. patent application Serial No. 107,962, Harland A. Bass, entitled Automatic Gain Control Circuit for Television Receiver, filed August 1, 1949, now Patent No. 2,559,038, granted July 3, 1951, and assigned to the same assignee as the present application and invention. Interposed between the AGC source and the control electrode is a filter network comprising a shunt capacitor 23, a series resistor 24, and a second shunt capacitor 25, the last-mentioned capacitor also performing the function of R. F. grounding the grid 21 of the R. F. amplifier tube, whereby the advantages of a grounded grid amplifier tube are realized, to wit: the shielding action of the grid in suppressing oscillation-producing feedback, and the application of the R. F. signal to the cathode circuit, whereby a broad-band match is obtained. Disposed across the heater is a capacitor 26, provided for the purpose of preventing parasitics.

Figure 2:
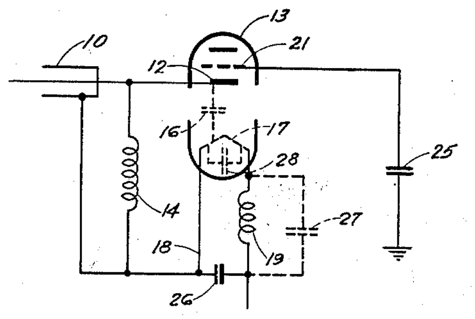
Fig. 2 is a circuit schematic of the radio-frequency input stage of the tuner.
Figure 3:
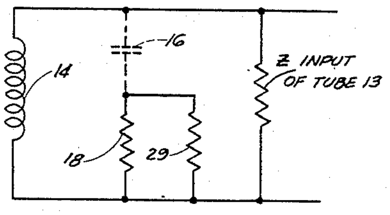
Fig. 3 is an equivalent circuit diagram employed as an aid in explaining the operation of the input circuit shown in Fig. 2.

In Fig. 2 there are shown the R. F. amplifier tube and associated circuit elements, together with certain distributed and inherent capacities which are utilized advantageously in accordance with the teachings of the invention. Referring now to choke 19, it will be observed that it is shunted by its own inherent capacitance (27, Fig. 2) and also by a capacitance which comprises the series combination of the inherent capacitance 28 between the heater terminals, this capacitance being on the order of 2.5 micromicrofarads, and the heater by-pass capacitor 26, the latter being effectively a short circuit at the frequencies under consideration. The resonant circuit comprising choke 19 and these two parallel capacitance parameters (27 and 26, 28) is also so formed as to be resonant at approximately 108 megacycles, the geometric mean between the extremes of the range of frequencies to be received, so that this parallel resonant circuit appears to be the equivalent of a resistor 29 (Fig. 3) which is very large in value with respect to the impedance of heater lead 18, whereby the operation of the resonant circuit comprising inductor 14 and inherent capacitance 16 is rendered substantially independent of the following factors: (1) tube replacement; and (2) change of heater voltage conditions due to changing line voltage.

It will be observed that this stage is of the grounded grid amplifier type, the control electrode being grounded by capacitor 25 for R. F. signals. The grounded grid type of amplifier has a relatively low input impedance approximately equal to the reciprocal of the mutual conductance of the tube and is essentially resistive. The input impedance of the type 6AB4 tube shown in this illustrative embodiment is approximately 160 ohms, the mutual conductance being in the region of 6250 microohms. The tube input circuit is comprised of the parallel resonant circuit consisting of inductor 14 and capacitance 16, this parallel resonant circuit being shunted by the equivalent input resistance of the tube. At resonance the inductor branch 14 approximates 300 ohms in impedance, the capacitor branch 16 approximates 300 ohms in impedance, and the tube input branch approximates 160 ohms in impedance, these figures being based on the following assumed dimensions: choke 14, 0.44 microhenry; capacitance 16, 3.5 micromicrofarads (paralleled by the distributed capacitance of inductor 14, 1.4 micromicrofarads), the resistance or equivalent resistance parameters in the capacitance branch being such that they can be neglected for purposes of this discussion. This resonant circuit shunted by the D. C. load varies narrowly in impedance between approximately 126 ohms and 160 ohms, so that a fairly constant match is provided for antenna input systems varying from 75 to 300 ohms.

Figure 4:
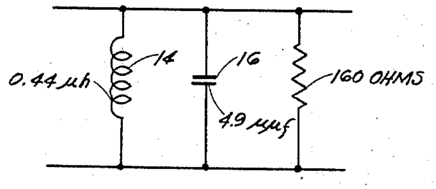
Fig. 4 is another circuit equivalent of the input illustrated in Fig. 2, together with computations developing the data for the curve of Fig. 5.
Figure 5:
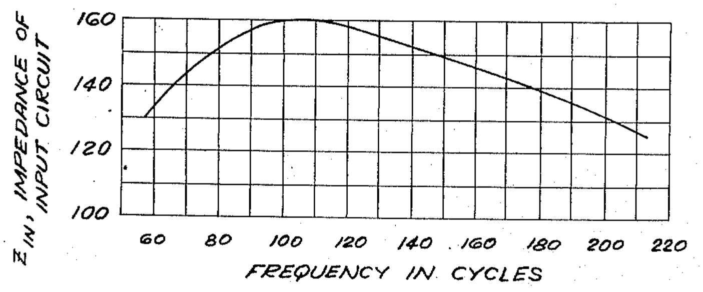
Fig. 5 is an R. F. input circuit impedance-frequency characteristic curve, it being plotted on a frame of Cartesian coordinates with impedance data as ordinates and frequency data as abscissae.

Referring now specifically to Fig. 4 of the drawings, it will be observed that suitable illustrative values have been assigned to the elements 14 and 16. The 160 ohm resistor therein shown represents the effective input impedance of tube 13, and the Fig. 4 showing is equivalent to those of Figs. 3 and 2 so far as the impedance "seen" by the incoming R. F. signals is concerned. The significant calculations in the tabulation included in Fig. 4 are frequency, plotted as abscissae in Fig. 5, and effective input circuit impedance, designated by the symbol $Z_{IN}$, plotted as ordinates in Fig. 5. It will be observed that the shape of the impedance charactertistic curve of Fig. 5 is such that an adequate match is provided, whether the line 10, 11 be a 75 ohm or a 300 ohm line or has any value between these two extremes.

Thus it will be seen that the invention provides a low impedance unbalanced input radio frequency amplifying stage for a television receiver comprising a high-mu triode tube 13 having cathode, control, and anode electrodes together with a separate two lead heating element, an inductance 14 connected between said cathode and a grounded one 18 of the leads of said heater, said inductance 14 and the inherent cathode-heater capacitance 16 of the tube forming a resonant circuit approximately at the geometric mean of the television broadcast range extending from 54 to 216 megacycles, another inductance 19 inserted in the other lead of said heater between said heater and its energy source +A, a capacitor 26 connected between the grounded lead and the terminal 20 of the second-mentioned inductance 19 adjacent said energy source, said other inductance 19 and the lumped 26, distributed 27, and inherent 28 capacitances in shunt therewith forming a circuit which is parallel resonant at said geometric mean and has an impedance large in value with respect to the impedance of the grounded heater lead 18, whereby the operation of the first-mentioned resonant circuit 14, 16 is rendered substantially independent of heater voltage variations.

The anode of tube 13 is shunt fed through a load network 30, 31, 32 connected to a source of space current indicated by the symbol +B. Several points at the same potential as the positive terminal of this source are assigned the reference numeral 42. The novel band pass selector circuit for intercoupling the output of the R. F. amplifier stage and the R. F. input of the mixer stage comprises two tuned circuits each of which includes common elements of an intercoupling network therebetween. One of these tuned circuits consists of inductance, comprising variable inductor 32 and adjustable inductor 31, arranged in series, and parallel capacitance comprised of the output capacitance of tube 13, the distributed capacitance of inductors 31, 32 and the effective capacitance of the coupling leg comprising elements 39, 33, 34 and 44. The other tuned circuit comprises inductance consisting of the series combination of variable inductor 36 and adjustable inductor 35, and parallel capacitance comprising the input capacitance of tube 47, the distributed capacitance of the elements 35, 36, and the effective capacitance of the coupling leg comprising elements 41, 33, and 34. For the purpose of intercoupling these two tuned circuits, there is provided an H-type coupling network, hereinbelow described in detail, comprising adjustable capacitor 39 connected between terminals 37 and 38, adjustable capacitor 41 connected between terminals 38 and 40, and the series combination of adjustable capacitor 33 and adjustable inductor 34 connected between terminal 38 and ground.

It will be understood that the tuning elements comprising inductor 32 and its contact 74, inductor 36 and its contact 75, and inductor 64 and its contact 76 are included in a three-gang spiral continuously variable ganged inductor. In this type of tuner a sliding contactor such as that indicated by the reference numeral 74, made of high silver content alloy possessing spring properties, rides on an inductor, such as that indicated by the reference numeral 32, made of silver wire. Contacts on the inductor provide circuit connections to both ends of the inductor. The sliding contactor "shorts" the unused portion of the inductance. Connected between terminal 38 of variable capacitor 33 and terminal 40 of the inductor 35, is an adjustable capacitor 41. In order to prevent short-circuiting of the +B terminal to ground there is interposed between terminal 42 of inductor 32 and the grounded terminal of inductor 34 a blocking capacitor 44. This selector circuit is effectively connected in parallel with the anode resistor 30 of tube 13 and the grid resistor 45 of tube 47, which resistors broaden the response curve somewhat. This adjustable coupling network provides a wide band tuning of the output circuit of the amplifier stage and the input circuit of the mixer stage and is adjustable through a wide range of frequencies.

A grid biasing network is provided in the input circuit of the mixer stage, which preferably comprises a pentode amplifier tube 47 such as the type 6AK5. This biasing network comprises a grid resistor 45 connected between control electrode and ground and a coupling capacitor 46 connected between the control electrode and terminal 40 of inductor 35. Local oscillations are injected into this input circuit by a connection from the oscillator stage through coupling capacitor 49. The suppressor grid is grounded as shown and the screen is provided with biasing potential by connection through a dropping resistor 50 to the positive terminal of the space current source, the screen being R. F. by-passed by a capacitor 51. The anode is connected to the space current source through inductors 60, 61, paralleled by a damping resistor 52, a by-pass capacitor 53 being connected between one lead of the load resistor 52 and ground, this by-pass condenser also functioning to complete the R. F. return to cathode for both legs of the oscillator tank circuit. The heater is connected between the positive heater supply line 55 and ground, as shown, a filament by-pass capacitor 56 being provided between the ungrounded filament lead and ground. The filament may be either A. C. or D. C. energized. The output terminals of this mixer stage are provided by ground and terminal 58. Interposed between the anode 59 and terminal 58 is a combination of a series adjustable iron core inductor 60 and a fixed shunt inductor 61.

Local oscillations are provided by a novel variable frequency oscillator manually tuned and tracked for an I. F. (intermediate frequency) difference with the band pass selector network. Preferably a triode 62 such as a type 6AB4 is employed. Inductance comprising an adjustable inductor 63 and a variable inductor 64 is arranged in series between the control electrode and the anode of tube 62 a blocking condenser 65 being interposed between terminal 94 of inductor 63 and the control electrode and a grid biasing resistor 67 being connected between said control electrode and the grounded cathode, as shown. The heater is connected between +A line 55 and ground. A series pair of capacitor 68 and 69 is effectively connected between the control electrode circuit and the anode, the central tap in the circuit between these capacitors being connected to cathode as shown. There is provided in parallel with the variable inductor 64 another inductor 70 having a fixed tap 71 which is connected to the positive terminal of the space current source through an inductor 72. A D. C. path for anode current in tube 62 may be traced from the anode through one-half (70A) of inductor 70, the center tap 71 and inductor 72. An A. C. path may be traced from the anode of tube 62 to tap 71, through inductor 72 and capacitor 53 to ground. This novel circuitry causes the oscillator to be stabilized over a wide range of frequency of the local oscillations from 80 to 240 megacycles, the operation of the oscillator being described in detail hereinbelow. It will of course be understood that the sliding contacts 74 and 75 and 76 of inductors 32 and 36 and 64 are variably positioned in unison for manual tuning, they being ganged as by any suitable conventional expedients indicated by the dashed lines 77, 78, 79, and 80.

It has been determined that the gain and noise characteristics of this tuner are well above average performance, and the other characteristics such as selectivity, suppression of spurious responses, low oscillator radiation, sensitivity, stabilization, compact mechanical construction, and narrow frequency shift, compare very favorably with the best commercial tuners presently available on the market.

A typical tuner in accordance with the invention has the following voltage gain characteristic between the antenna and the input circuit of the first intermediate frequency stage (not shown), as determined in a typical case employing a 75 ohm dummy antenna input and a first intermediate frequency tube (not shown) with a 1000 ohm resistive plate load:

| Channel | Gain |
|---|---|
| 2 | 33.2 |
| 3 | 36.4 |
| 4 | 40.0 |
| 5 | 40.0 |
| 6 | 38.0 |
| 7 | 27.6 |
| 8 | 22.8 |
| 9 | 20.5 |
| 10 | 22.2 |
| 11 | 22.8 |
| 12 | 25.8 |
| 13 | 30.7 |

The requirements which are satisfied by the band pass selector network herein shown are very rigorous in that it must be tunable through a range from 54 to 216 megacycles while maintaining an acceptance band having a width of 4 to 6 megacycles or more and while manifesting substantial uniformity of gain at the extremes of the bands. In the specific illustrative selector network shown, the band width has been found to approach but to exceed 4 megacycles when the tuner is attuned to channels 2 (54–60 megacycles) and 13 (210–216 megacycles), and the band width exceeds 6 megacycles at channels 6 or 7 (82–88, 174–180 megacycles). A double hump band pass charcteristic is provided by two coupled tuned circuits the equivalents of which are marked A and B in Fig. 6.

Figures 6, 7:
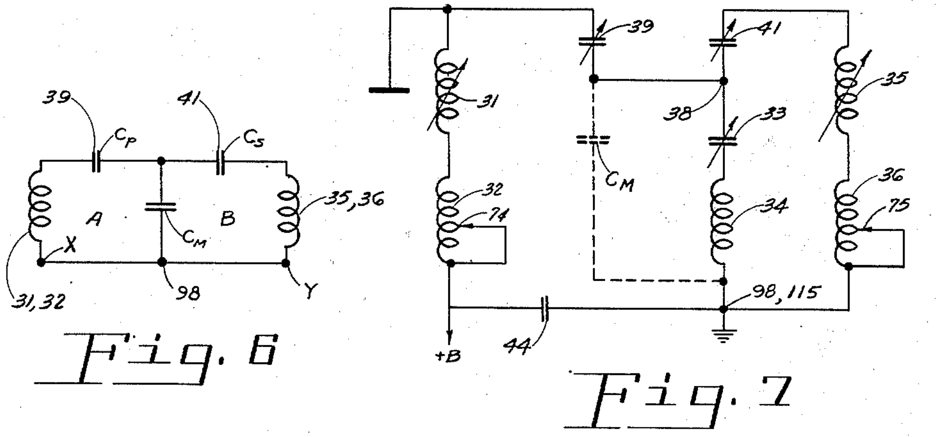
Fig. 6 is a circuit equivalent of Fig. 7.
Fig. 7 is a circuit diagram of the band pass selector network provided in the tuner in accordance with the present invention.
Figure 8:
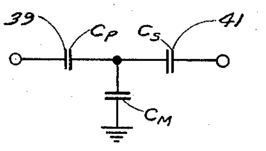
Fig. 8 is a diagram of a T-type capacitive coupling circuit employed as an aid in describing the Fig. 7 band pass selector network.

The Fig. 6 diagram will be understood to be roughly an equivalent for all elements of the selector network illustrated in Figs. 1 and 7, excepting 33, 34. The Fig. 1 network includes the following components: 31, 32, 44, 39, 33, 34, 41, 35, 36. The Fig. 6 network is simplified for purposes of explanation of operation. In accordance with the invention, the coupling between the primary and secondary circuits is effected not only by the fixed mutual capacitance marked $C_M$ in Fig. 7, but also by reason of the provision of the leg comprising capacitor 33 and inductor 34. This leg is designed to be resonant at a frequency above the band of frequencies to be received, and this leg therefore acts effectively as an additional capacitive coupling element in parallel with $C_M$ throughout the tuning range of the band pass selector network. Detailed explanation of this feature is postponed for the moment pending consideration of the usual T-type capacitive coupling. The circuit shown in Fig. 8 is well known to those skilled in the art. Let it be supposed for purposes of discussion that each of $C_P$ and $C_S$ is associated with a proper inductance, so that two tuned coupled circuits are formed. When the supposititious primary and secondary are over-coupled and both tuned to the same frequency, the secondary current characteristic has two humps when the coupling is large, and therefore this well-known type of circuit has a desirable band pass characteristic. However, when double tuned circuits employing over-coupling (beyond critical) are tuned (Fig. 8) through a wide range, as by variation of inductance parameters therein, the acceptance band is widened as the resonant frequencies are increased, since the coefficient of coupling is purely a function of $C_M$ and the primary and secondary capacitance parameters and remains constant.

An object of the invention is to prevent the pass band from being unduly wide at the high end of the tuning range, while at the same time insuring that the acceptance band is sufficiently wide at the low end of the tuning range to prevent excessive side band cutting. In accordance with the invention, substantial constancy of the pass band is effected throughout the range by providing the series combination of capacitor 33 and inductor 34 in shunt with the capacitance $C_M$. As hereinbefore indicated, the circuit 33, 34 is resonant at a frequency above the tuning range and therefore the impedance of the circuit 33, 34 drops off as the tuner is adjusted from a lower frequency channel to a higher frequency channel. It will be seen that at resonance the circuit 33, 34 would effectively be a short circuit across the capacitance $C_M$, and the coupling between the primary and the secondary circuits would be reduced to an extremely low value. The coupling between the primary and secondary circuits is a function of the value of their common impedance. The common impedance comprising $C_M$ and the circuit elements 33 and 34 falls off at a much more rapid rate with increase in frequency, than would the impedance of $C_M$ alone. The combination of $C_M$ and the leg comprising capacitor 33 and inductor 34 is equivalent to a capacitive coupling parameter which decreases in value at a proper rate with an increase in frequency. Since this coupling parameter behaves in this manner it effectively decreases the coefficient of coupling between primary and secondary circuits as the tuner is tuned to higher frequencies. Conversely, when the frequency to which the tuner is adjusted decreases, the common impedance comprising $C_M$ and the leg 33, 34 tightens the coupling between the primary and secondary circuits and preserves uniformity of the pass band. Thus the band pass selector provided in accordance with the invention successfully maintains an acceptance band of from 4 to 6 megacycles throughout its tuning range.

Figure 11:
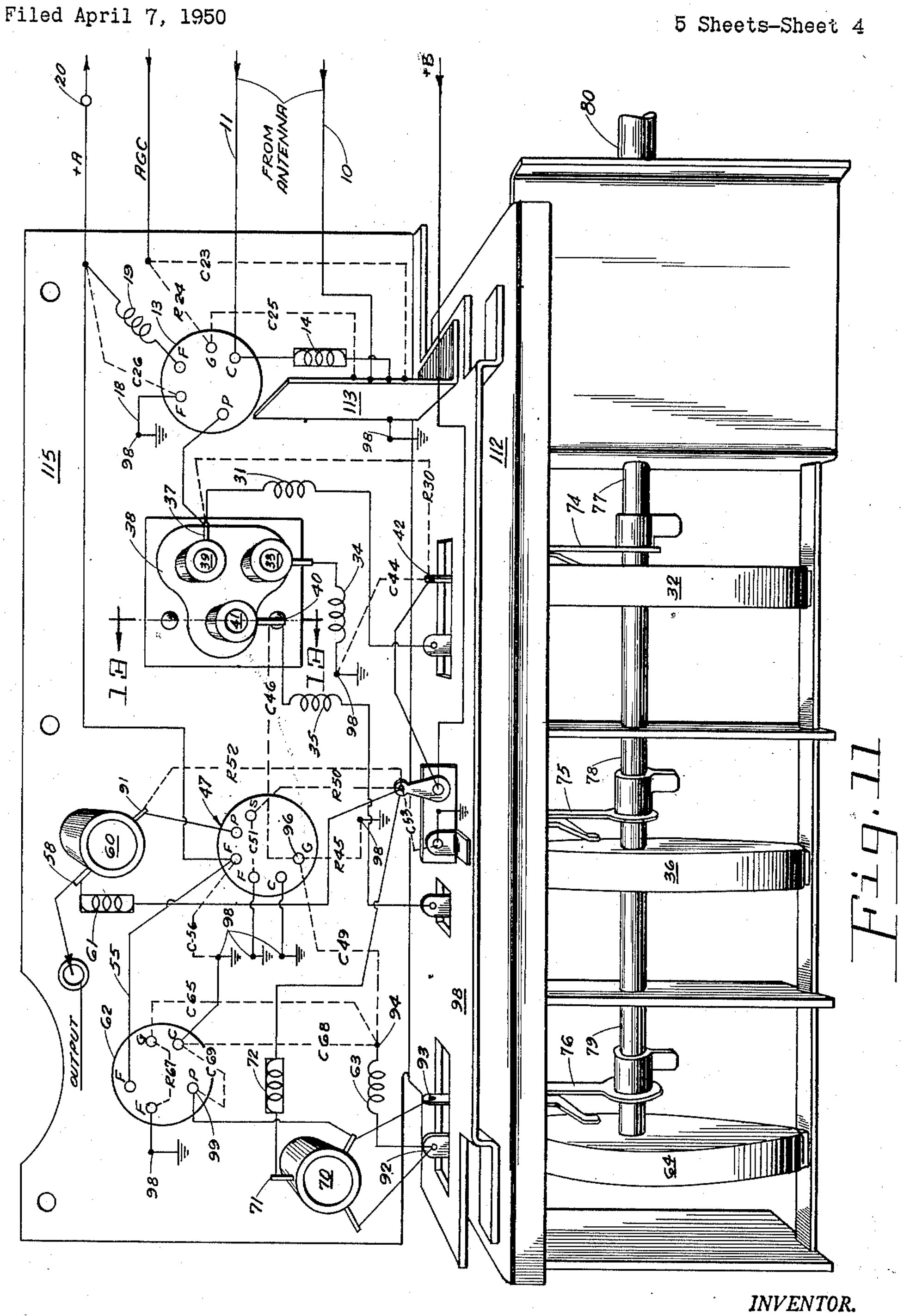
Fig. 11 is a front perspective view of the tuner assembly including the circuitry provided in accordance with the invention.
Figure 13:
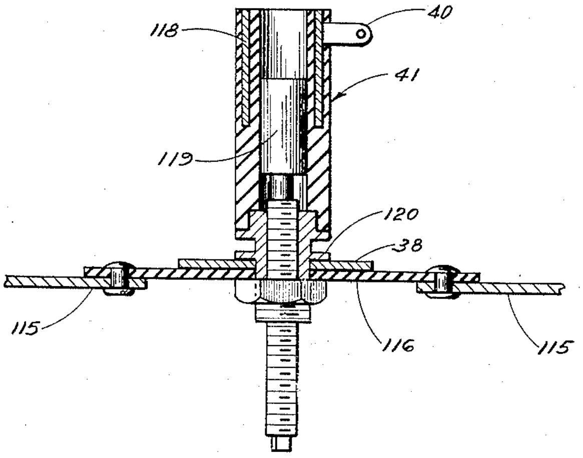
Fig. 13 is a fragmentary sectional view taken on the line 13—13 of Fig. 11 showing the details of the coupling plate provided in accordance with the present invention.

In this circuit, $C_M$ is the capacity between a coupling plate 38 (to which one plate of each of capacitors 39, 41, 33 is connected) and the grounded metallic support 115, as shown in Figs. 11, 7, and 13.

While I do not desire to be limited to any one specific set of circuit parameters, the latter varying in accordance with particular design requirements, the following have been found to be satisfactory in one successful embodiment of the present invention:

| *Element:* | *Value or type* |
|---|---|
| **13** | Tube type 6AB4 |
| **47** | Tube type 6AK5 |
| **62** | Tube type 6AB4 |
| Capacitor **26** | 470 micromicrofarads |
| Capacitor **44** | 1000 micromicrofarads |
| Capacitor **46** | 15 micromicrofarads |
| Capacitor **49** | 1 micromicrofarad |
| Capacitor **51** | 470 micromicrofarads |
| Capacitor **56** | 470 micromicrofarads |
| Capacitor **53** | 1000 micromicrofarads |
| Capacitor **65** | 5 micromicrofarads |
| Capacitor **68** | 6 micromicrofarads |
| Capacitor **69** | 4 micromicrofarads |
| Capacitor **25** | 5000 micromicrofarads |
| Capacitor **23** | 1000 micromicrofarads |
| Capacitor **39** | 1.5–8 micromicrofarads |
| Capacitor **41** | 1.5–8 micromicrofarads |
| Capacitor **33** | 1.5 – 12.5 micromicrofarads |
| $C_M$ | 6.5–7 micromicrofarads |
| Cathode-heater capacitance of tube **13** | 3.5 micromicrofarads |
| Resistor **24** | 220,000 ohms |
| Resistor **30** | 3600 ohms |
| Resistor **45** | 1 megohm |
| Distributed capacitance of inductor **14** | 1.4 micromicrofarads |
| Resistor **50** | 150,000 ohms |
| Resistor **52** | 10,000 ohms |
| Resistor **67** | 12,000 ohms |
| Inductor **14** | 0.44 microhenry |
| Variable inductor **31** | 0.018–0.03 microhenry, normally |
| Variable inductor **35** | 0.02–0.035 microhenry, normally |
| Variable inductor **32** | 0.025–0.692 microhenry |
| Variable inductor **64** | 0.025–0.692 microhenry |
| Variable inductor **36** | 0.025–0.692 microhenry |
| Inductor **19** | 0.6 microhenry |
| Variable inductor **63** | 0.03–0.04 microhenry |
| Variable inductor **34** | 0.035–0.045 microhenry |
| Iron core variable inductor **70** | 0.04 microhenry, each section, without core; 0.125 microhenry, whole coil with iron in place |
| Inductor **72** | 1.1 microhenries |
| Plate supply voltage, +B | 120–150 volts |

Thus it will be seen that the invention embraces a band pass selector network tunable throughout the standard television broadcast band for intercoupling the anode circuit of the radio frequency amplifier tube 13 and the control electrode circuit of the frequency changing tube 47 of a television receiver while maintaining a broad acceptance band sufficiently wide to pass the video and synchronizing signal components, comprising two branches, each of said branches consisting of the combination of an adjustable inductor and a variable inductor cumulatively connected, one of said combinations 31, 32 resonating with the inherent capacitance provided by said anode circuit and the other of said combinations 35, 36 resonating with the inherent capacitance provided by said control electrode circuit to provide double tuned band-pass selection, means 74, 75, 77, 78, 80 for tuning each of said variable inductors in unison by short-circuiting portions thereof, means 44 and wiring for R. F. connecting one terminal of each of said variable inductors to a low potential terminal 98, and an H-type capacitive coupling circuit between said branches comprising a pair of capacitors 39, 41 connected in series between the remaining terminals of said adjustable inductors, a series combination of a third capacitor 33 and a fourth inductor 34 connected between the junction of said pair and said low potential terminal as a series resonant circuit tuned above the band of received signal frequencies to constitute a capacitive coupling element thereby to decrease the coupling between the two resonant branch circuits as said selector network is tuned to pass higher frequency bands, thus tending to maintain an acceptance band of uniform width throughout all television channels, and a fourth capacitive coupling parameter, in shunt with said series resonant circuit, comprising the inherent capacitance between said low potential terminal (chassis 98) and interconnected terminals (plate 38) of the first three capacitors.

I prefer to process the tuner at the factory by employing capacitors 39, 41, and 33 of the band pass selector network for alignment at channel 4. These capacitors are sometimes roughly referred to as trimmer capacitors. At channel 11 I prefer to align with the adjustable inductors 31, 34 and 35, so far as the band pass selector network is concerned. Referring now to the oscillator, I align with the iron core inductor 70 at channel 4 and with the adjustable inductor 63 at channel 13. The inductors 31, 35, and 63 are herein referred to as "end" inductors.

Figure 9:
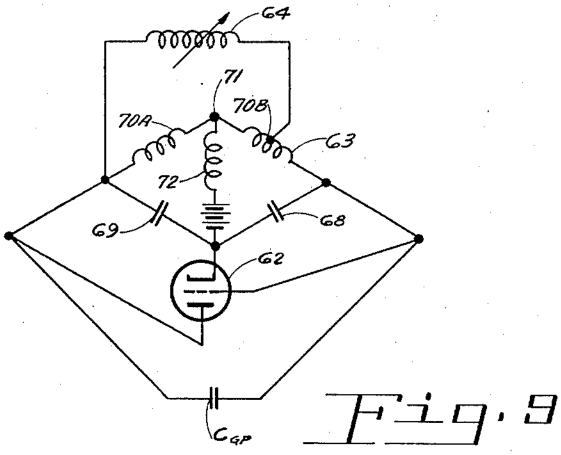
Fig. 9 is an equivalent circuit diagram employed as an aid in describing the Fig. 10 oscillator.
Figure 10:
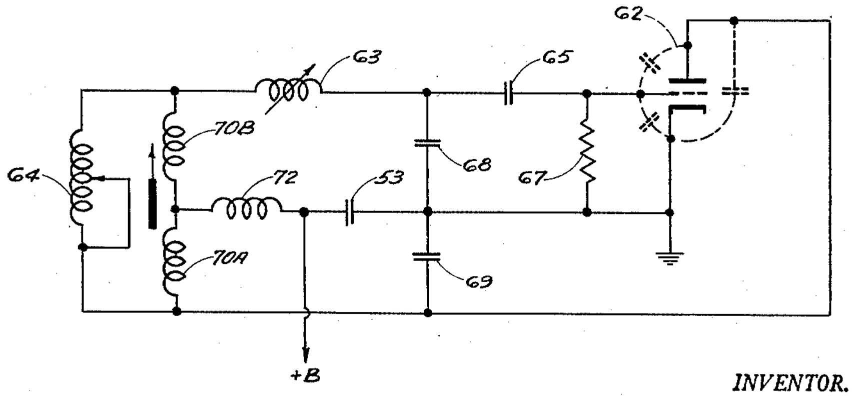
Fig. 10 is a circuit diagram of the oscillator stage of the Fig. 1 tuner.

In accordance with the invention a novel oscillator is provided in this tuner. This oscillator is illustrated in Fig. 10, and although at first glance it may appear to have some points of similarity to the well-known Colpitts type oscillator, it will readily be seen from an examination of the equivalent circuit of Fig. 9 that it substantially departs from such type of oscillator. This novel oscillator has a tuned plate tank circuit, a tuned grid tank circuit, and a common cathode impedance in both circuits. In Fig. 9 there is shown a simplified equivalent circuit diagram of the Fig. 10 oscillator, those components which have significance at operating radio frequencies being shown. In Fig. 9 the grid capacitor 65 and the grid resistor 67 are omitted because they are not susbtantial frequency-determining parameters. In Fig. 10 the anode supply circuit for tube 62 may be traced from the plate of tube 62, through inductors 70A and 72 to the +B terminal 42. In Fig. 9 an equivalent plate supply is symbolically indicated by a battery connected in an equivalent position between the cathode and one lead of inductor 72.

It will be seen that this novel oscillator has a grid tank circuit comprising inductor 70B, inductor 63, capacitor 68, and inductor 72. This oscillator also has a plate tank circuit comprising inductor 70A, capacitor 69, and inductor 72, the last-mentioned inductor being in the cathode circuit and common to both tank circuits, so that the portion of the voltage fed back from the plate circuit to the grid circuit is applied to the grid circuit through this common inductance 72. In the well-known conventional tuned grid, tuned plate type of oscillator, such as that shown at page 392, Figs. 10–55, Reich Theory and Applications of Electron Tubes, Second Edition, McGraw-Hill Book Company, Inc., New York, the grid-plate capacitance $C_{GP}$ provides the feedback path. My novel oscillator differs from this type of circuit in the respect, among others, that feedback voltage is applied to the grid circuit by the common inductor 72.

It should be noted that the capacitors 69 and 68 also function as a voltage divider network between input and output circuits, the voltages for their respective terminals remote from one another being approximately 180 degrees out of phase, so that feedback will result.

A serious limitation is placed on the operation of the usual conventional tuned grid, tuned plate type of oscillator. In that type, for proper design the inductive reactance of the tank circuit must be less than the capacitive reactance of the grid plate interelectrode capacity at the operating frequency. Since the inductive reactance of a given lumped inductance increases with frequency while the capacitive reactance between a given grid and plate decreases with frequency, the greater the operating frequency, the more difficult is the attainment of this design objective. Since that conventional type of circuit depends entirely on the $C_{GP}$ parameter for feedback, the intensity of the local oscillations produced tends to decrease with increases in operating frequency. The oscillator in accordance with the present invention does not suffer from this difficulty because the common inductor assures high impedance coupling even at the highest operating frequencies, such as 240 megacycles, and the signal strength of the local oscillations is preserved during reception on the upper frequency channels. In this oscillator circuit the magnetic feedback coupling between the plate and grid circuits increases as the operating frequency is increased.

The oscillator in accordance with the invention possesses a high degree of stability throughout its range of operation, because both tank circuits are tuned in unison. Tuning is effected by variation of inductor 64, the latter being connected between the junction of inductor 70A and capacitor 69 and the junction of inductors 70B and 63. Inductor 63 is magnetically isolated from inductor 70B as shown in Fig. 11, and there is essentially no mutual coupling therebetween.

In the particular embodiment shown, it will be seen that the lumped capacitance 68 is in shunt with the inherent cathode-grid interelectrode capacitance, and it will be obvious to those skilled in the art that the interelectrode capacitance alone can be employed in lieu of the interelectrode capacitance plus the lumped capacitance 68. Similarly, in the particular embodiment shown, I have illustrated a lumped capacitance 69 in shunt with the cathode-plate interelectrode capacitance. It will be understood that the last-mentioned interelectrode capacitance alone may be utilized in lieu of said interelectrode capacitance plus the lumped capacitance 69. This circuit has considerable advantages over the Colpitts and tuned plate, tuned grid types of oscillator. In the Colpitts type of oscillator the cathode to grid and the cathode to plate lumped capacitances must be varied in unison in order to maintain oscillation through a range of frequencies. The common disadvantage of the tuned grid, tuned plate oscillator is that it may oscillate at two frequencies so that the signal frequency may jump from one value to another. The Colpitts type of oscillator must be shunt fed and the Hartley is generally shunt or parallel fed.

The common characteristic of such conventional oscillators is that the local oscillations tend to fall off in intensity with an increase in frequency. The signal gain and noise ratio requirements of the tuner provided in accordance with the invention involve substantially constant oscillator injection into the mixer throughout the range of operation, and this oscillator circuit satisfies this requirement.

The operating frequency of the oscillator is the frequency to which the LC circuit comprising capacitors 69 and 68 (and the effective capacitance in shunt therewith) and inductors 64 and 63 (and the inductance effectively in shunt therewith) is tuned. If it be assumed that this frequency is, say, 200 megacycles, then each of the grid and tank circuits, considered alone, is so tuned below the operating frequency as to appear capacitive at that frequency. In fact, each of these tank circuits, considered alone, appears to be capacitive at each operating frequency.

Another advantage of the ocillator in accordance with this invention is that it meets the requirements of uniformity and stability and at the same time operates satisfactorily on a low voltage supply.

As will be apparent from an inspection of Fig. 9, the grid-anode capacitance parameter denominated $C_{GP}$ furnishes additional coupling between the grid and plate tank circuits. However, the principal coupling is that afforded by the common magnetic element or inductor in the cathode circuit. As indicated in Fig. 9, the oscillator is adjusted as to frequency by manual variation of inductor 64, that variable inductor being ganged with inductors 36 and 32.

The invention thus provides an oscillator comprising an electron tube 62 having at least cathode, grid, and plate electrodes, a grid tank circuit comprising capacitance 68 between said grid and said cathode paralleled by a series combination of two inductors 63—70B, 72, a plate tank circuit comprising capacitance 69 between plate and cathode paralleled by a series combination of two inductors 70A, 72, one 72 of the two inductors included in each tank circuit being common to both and being electrically disposed between said cathode and the junction of the remaining two inductors, said common inductor providing magnetic coupling between said plate and grid tank circuits.

In the description of the preferred mechanical assembly in accordance with the invention, the positions of the following elements are shown in detail: Tube 13, tube 47, tube 62, capacitors 39, 41, and 33, inductors 31, 32, 34, 35, 36, 60, 61, 14, 72, 63, 64, 19 and 70. The other circuit elements are simply suggested by dashed lines: for example, the dished line having the symbol CS8 at the midpoint thereof in Fig. 11 and connected between point 94 and the grounded cathode of tube 62 has reference to the capacitor 68, Fig. 1, which is effectively connected in Fig. 1 between point 94 and point 98. Similarly, the dashed line between points 94 and 96 in Fig. 11 indicates the capacitor 49 which is employed for purposes of oscillation injection, point 96 being effectively the mixer tube grid and point 94 being the junction of capacitor 49, inductor 63, and capacitor 65. It is well known to those skilled in the art that capacitors and resistors are simply suspended between convenient points and soldered onto leads or terminals, and therefore the circuit elements indicated by the dashed lines are not shown in detail in Fig. 11, no claims being directed to the particular manner of positioning those elements, various modes of so doing being well known to those skilled in the art. It should be particularly observed that end inductor 31, end inductor 63, and end inductor 35 are shielded, to the fullest extent practicable, by metallic divider 112 from the main inductor tuning coils 32, 64, and 36 respectively. It will also be observed that the inductor 31 is shielded by the vertically extending divider 113 from the R. F. input stage element 14. The present invention differs from the prior art in the respect, among others, that magnetic coupling between coils 31 and 32 and between coils 35 and 36 is prevented to the fullest extent possible. Elements 31, 32 inductively add. So also, coils 35, 36. It will also be observed from Fig. 11 that inductors 31 and 35 are spaced from each other to prevent magnetic coupling therebetween.

Figure 12:
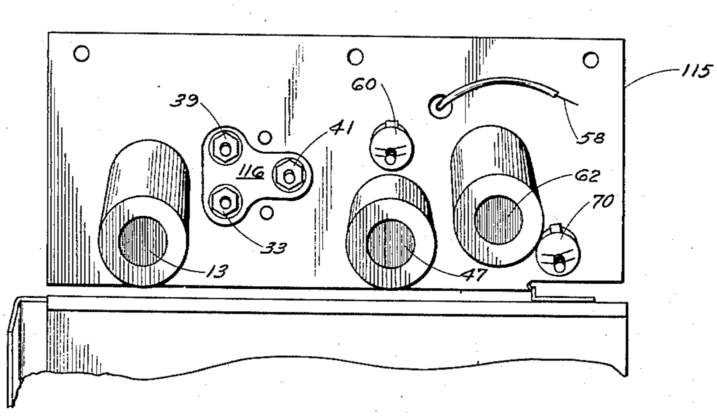
Fig. 12 is a rear view of the assembly.

It will be noted that the mounting assembly comprises a main base member 98 extending in a generally horizontal direction, and an integral vertical dividing member 115. As shown in Fig. 12, the tubes 13, 47, and 62 are mounted to the rear of this dividing member, and the mounting screws for the capacitors 33, 39, and 41 are also brought out to the rear. Secured to the main base member 98 is another dividing member 113 which is transverse to both members 115 and 98. The base member 98 is secured to the metallic top 112 of the ganged inductor unit as best shown in Fig. 11. It will be understood that the elements 98, 113, 115, and 112 are at the same D. C. potential, that 98 is the main base or ground member, and that the elements 113, 115, and 112 are of primary utility as shields. The parameter $C_M$ (Fig. 7) has been hereinabove discussed in some detail. It is in effect the capacitance between the metallic coupling plate 38 and the metallic divider 115, as will be apparent from an inspection of Fig. 13. This figure shows the details of the mounting of capacitor 41, Fig. 11 indicates that the three capacitors 41, 39, and 33 are mounted in the same fashion. Capacitor 41 is formed with a metallic plate 118, connected to inductor 35, and another plate 119, which is connected through its adjustable mounting 120 to the coupling plate 38. Those plates of capacitors 39 and 33 which correspond to plate 119 of capacitor 41 are likewise connected to coupling plate 38. $C_M$ therefore may be provided by the inherent capacitance between the low potential terminal 98 of the band pass selector network and the interconnected plates of capacitors 41, 39, and 33, plate 119 only of this interconnected group being shown in Fig. 13. It will be understood that this capacitance is in effect increased by the provision of the coupling plate 38, several terminals and elements at the same potential bearing the reference numeral 38 for purposes of simplicity, the main coupling plate being shown in detail in Figs. 11 and 13. The coupling plate 38 is spaced from the vertically extending divider 115 as by a dielectric strip 116. The margins of the dielectric strip spaced from the coupling plate are riveted to the vertical divider 115, the divider being apertured as indicated in Fig. 13. The desired capacitance $C_M$ is provided by proper selection of the dielectric material of the required thickness and by proper determination of the area of the coupling plate 38, the design factors involved in providing a capacitor per se being well known to those skilled in the art. It will be understood that in lieu of the specific improved ganged inductor illustrated in Fig. 11, the Mallory type of ganged inductor hereinabove mentioned and illustrated at Figure 167 of the Photofact text may also be used.

In the foregoing description I have used such reference numerals as 98 and 42 to indicate points which are at the same D. C. potential. I have also used simplified figures such as that shown in Fig. 8 for purposes of clarity in description of operation. Fig. 8 is representative of the T-type coupling, while H-type coupling is actually employed in the band pass selector network illustrated in Fig. 7. In H-type coupling the cross arm of the H, which extends horizontally in ordinary capital lettering, extends vertically as shown in Fig. 6, and the two legs of the H extend horizontally, the upper leg being shown in Fig. 6 as $C_P$ and $C_S$. The lower leg consists of the distributed impedance between point X and grounded point 98 and point Y and grounded point 98 shown in Fig. 6.

While there has been shown and described what is at present considered to be the preferred embodiment of the present invention, it will be understood by those skilled in the art that various modifications and substitutions of equivalents may be made therein without departing from the true spirit of the invention and the scope of the claims appended hereto.

I claim:

1. In a television receiver tuner, a low impedance unbalanced input radio frequency amplifying stage comprising a high-mu triode tube having cathode, control, and anode electrodes together with a separate two lead heating element, an inductance effectively connected between said cathode and a grounded one of the leads of said heater, said inductance and the inherent cathode-heater capacitance of the tube forming a resonant circuit approximately at the geometric mean of the television broadcast range extending from 54 to 216 megacycles, another inductance inserted in the other lead of said heater between said heater and its energy source, a capacitor connected between the grounded lead and the terminal of the second-mentioned inductance adjacent said energy source, said other inductance and the lumped, distributed, and inherent capacitances in shunt therewith forming a circuit which is parallel resonant at said geometric mean and has an impedance large in value with respect to the impedance of the grounded heater lead, whereby the operation of the first-mentioned resonant circuit is rendered substantially independent of heater voltage variations.

2. In a television receiver tuner, a low impedance unbalanced input radio frequency amplifying stage comprising a triode tube having cathode, control, and anode electrodes together with a separate two lead heating element, and an inductance connected between said cathode and a grounded one of the leads of said heater, said inductance and the inherent cathode-heater capacitance of the tube forming a resonant circuit approximately at the geometric mean of the television broadcast range extending from 54 to 216 megacycles.

3. In a television receiver tuner, a low impedance unbalanced input radio frequency amplifying stage comprising a high-mu triode tube having cathode, control, and anode electrodes together with a separate two lead heating element, an inductance connected between said cathode and a grounded one of the leads of said heater, said inductance and input capacitance of the tube forming a resonant circuit approximately at the geometric mean of the television broadcast range extending from 54 to 216 megacycles, another inductance inserted in the other lead of said heater between said heater and its energy source, a lumped capacitor connected between the grounded lead and the terminal of the second-mentioned inductance adjacent said energy source, said other inductance and the lumped, distributed, and inherent capacitances in shunt therewith forming a circuit which is parallel resonant at said geometric mean and has an impedance large in value with respect to the impedance of the grounded heater lead, whereby the operation of the first-mentioned resonant circuit is rendered substantially independent of heater voltage variations, said other inductance being paralleled by one branch consisting of its own distributed capacitance, and another branch comprising the series combination of said lumped capacitor and the inherent capacitance between the heater leads.

4. In a television receiver tuner, a low impedance unbalanced input radio frequency amplifying stage comprising a high-mu type 6AB4 triode tube having cathode, control, and anode electrodes together with a separate two lead heating element, an inductance of 0.44 microhenry connected between said cathode and a grounded one of the leads of said heater, said inductance and the inherent cathode-heater capacitance of 4.9 micromicrofarads of the tube forming a resonant circuit approximately at the geometric mean of the television broadcast range extending from 54 to 216 megacycles, another inductance of 0.6 microhenry inserted in the other lead of said heater between said heater and its energy source, a capacitor of 470 micromicrofarads connected between the grounded lead and the terminal of the second-mentioned inductance adjacent said energy source, said other inductance and the lumped, distributed, and inherent capacitances in shunt therewith forming a circuit which is parallel resonant at said geometric means and has an impedance large in value with respect to the impedance of the grounded heater lead, whereby the operation of the first-mentioned resonant circuit is rendered substantially independent of heater voltage variations.

EMMERY J. H. BUSSARD.

REFERENCES CITED

The following references are of record in the file of this patent:

UNITED STATES PATENTS

| Number | Name | Date |
|---|---|---|
| 1,724,057 | Weaver | Aug. 13, 1929 |
| 2,052,703 | Farnham | Sept. 1, 1936 |
| 2,115,858 | Keall | May 3, 1938 |
| 2,223,835 | Smith | Dec. 3, 1940 |
| 2,234,184 | MacLaren | Mar. 11, 1941 |
| 2,314,309 | Hobbs | Mar. 16, 1943 |
| 2,314,958 | Ziel et al. | Mar. 30, 1943 |
| 2,315,296 | Strutt et al. | Mar. 30, 1943 |

FOREIGN PATENTS

| Number | Country | Date |
|---|---|---|
| 853 988 | France | Apr. 2, 1940 |